US011068880B2

(12) United States Patent
Van Nieuwenhuyze et al.

(10) Patent No.: US 11,068,880 B2
(45) Date of Patent: Jul. 20, 2021

(54) CONTROL OF APPLICATIONS IN A MOBILE TERMINAL

(71) Applicants: STMicroelectronics (Rousset) SAS, Rousset (FR); Proton World International N.V., Diegem (BE)

(72) Inventors: Olivier Van Nieuwenhuyze, Wezembeek-Oppem (BE); Alexandre Charles, Auriol (FR)

(73) Assignees: STMicroelectronics (Rousset) SAS, Rousset (FR); Proton World International N.V., Diegem (BE)

( * ) Notice: Subject to any disclaimer, the term of this patent is extended or adjusted under 35 U.S.C. 154(b) by 637 days.

(21) Appl. No.: 15/180,989

(22) Filed: Jun. 13, 2016

(65) Prior Publication Data

US 2017/0206520 A1 Jul. 20, 2017

(30) Foreign Application Priority Data

Jan. 18, 2016 (FR) ...................... 1650378

(51) Int. Cl.
*G06Q 20/32* (2012.01)
*G06Q 20/20* (2012.01)
*G06Q 20/34* (2012.01)
*H04M 1/72403* (2021.01)
*H04M 1/72463* (2021.01)
*G06Q 20/40* (2012.01)

(52) U.S. Cl.
CPC ......... *G06Q 20/3278* (2013.01); *G06Q 20/20* (2013.01); *G06Q 20/202* (2013.01); *G06Q 20/204* (2013.01); *G06Q 20/3223* (2013.01); *G06Q 20/3227* (2013.01); *G06Q 20/352* (2013.01); *G06Q 20/401* (2013.01); *H04M 1/72403* (2021.01); *H04M 1/72463* (2021.01)

(58) Field of Classification Search
CPC .. G06Q 20/3278; G06Q 20/20; G06Q 20/202; G06Q 20/204
USPC ............... 705/21, 16, 26; 235/439; 455/411; 713/176, 187
See application file for complete search history.

(56) References Cited

U.S. PATENT DOCUMENTS 8,799,087 B2 8/2014 Martin et al.
10,147,076 B2 * 12/2018 Zhou ........................ G09C 5/00
(Continued)

FOREIGN PATENT DOCUMENTS

CN 102160070 A 8/2011
CN 104145285 A 11/2014
(Continued)

OTHER PUBLICATIONS

International Standard, "Identification cards—Integrated circuit cards—Part 4: Organization, security and commands for interchange," reference No. 7816-4:2005(E), second edition, Jan. 2005, 90 pages.

*Primary Examiner* — Vanel Frenel
(74) *Attorney, Agent, or Firm* — Seed IP Law Group LLP (57) ABSTRACT

A method of controlling the execution of a payment application by a mobile terminal, in near field communication with a payment device. The method includes transmitting an application selection request to the payment device, and verifying the application identifier received from the payment device against a list of authorized applications. The verification is performed by the circuit having the application selection request transiting therethrough.

22 Claims, 3 Drawing Sheets

(56) References Cited

U.S. PATENT DOCUMENTS

| | | | |
|---|---|---|---|
| 2007/0255653 A1 | 11/2007 | Tumminaro et al. | |
| 2012/0109764 A1* | 5/2012 | Martin | G06Q 20/204 |
| | | | 705/17 |
| 2012/0197745 A1* | 8/2012 | Fisher | G06Q 20/382 |
| | | | 705/21 |
| 2013/0054474 A1* | 2/2013 | Yeager | G06Q 20/02 |
| | | | 705/71 |
| 2013/0086375 A1 | 4/2013 | Lyne et al. | |
| 2013/0262311 A1* | 10/2013 | Buhrmann | G06Q 20/40 |
| | | | 705/44 |
| 2014/0006194 A1* | 1/2014 | Xie | G06Q 20/3278 |
| | | | 705/21 |
| 2015/0033289 A1 | 1/2015 | Caceres et al. | |
| 2015/0118958 A1* | 4/2015 | Jain | G06Q 20/353 |
| | | | 455/41.1 |
| 2015/0271677 A1 | 9/2015 | Van Nieuwenhuyze et al. | |
| 2015/0294294 A1* | 10/2015 | Grinberg | G06Q 20/3223 |
| | | | 705/39 |
| 2016/0042338 A1* | 2/2016 | Jooste | G06Q 20/3278 |
| | | | 705/21 |
| 2016/0197725 A1* | 7/2016 | Hammad | G06F 21/34 |
| | | | 713/189 |
| 2016/0350746 A1* | 12/2016 | Johnson | G06Q 20/385 |
| 2018/0005238 A1* | 1/2018 | Hammad | G06F 21/34 |

FOREIGN PATENT DOCUMENTS

| | | |
|---|---|---|
| CN | 104200362 A | 12/2014 |
| CN | 104966196 A | 10/2015 |
| KR | 20140029062 A | 3/2014 |
| WO | 2015/183412 A1 | 12/2015 |

\* cited by examiner

CONTROL OF APPLICATIONS IN A MOBILE TERMINAL

CROSS-REFERENCE TO RELATED APPLICATIONS

This application claims the priority benefit of French patent application number 16/50378, filed on Jan. 18, 2016.

BACKGROUND

Technical Field

The present disclosure generally relates to electronic circuits and, more specifically, to mobile terminals of cell or mobile phone type. The present disclosure more particularly aims at such mobile phones used as mobile points of sale (mPOS).

Discussion of the Related Art

The development of mobile phones equipped for near field communication (NFC) has first enabled to use such phones as payment cards or access cards. The next step is to be able to use such mobile phones as payment terminals, that is, as mobile points of sale (mPOS). The phone, via its contactless front end (CLF), operates in terminal mode, and receives the information from a contactless microcircuit card or from another mobile device operating in card mode. The phone then behaves as a payment terminal.

However, unlike dedicated payment terminals which generally only host payment applications (called bank applications hereafter), a mobile phone hosts various more or less secure applications.

There thus is a need to make sure that transactions are secure when the phone or more generally the mobile terminal operates as a point of sale.

BRIEF SUMMARY

It would be desirable to have a solution for verifying the nature of an application executed by a mobile terminal when the latter operates as a mobile point of sale.

It would be desirable to have a solution compatible with existing cards and payment applications.

It would be desirable to have a solution particularly adapted to transactions based on contactless communications.

Thus, an embodiment provides a method of controlling the execution of a payment application by a mobile terminal, in near field communication with a payment device, comprising the steps of:
  transmitting an application selection request to the payment device; and
  verifying the application identifier received from the payment device against a list of authorized applications, the verification being performed by the circuit having the application selection request transiting therethrough.

According to an embodiment, the execution of the applications of said list is blocked by default.

According to an embodiment, in case of a failure of the verification, the mobile terminal transmits to the payment device the information that there is no compatibility.

According to an embodiment, for an application contained in said list, said circuit having the application selection request transiting therethrough only authorizes the execution if the request originates from a secure element.

According to an embodiment, the device is a microcircuit card.

According to an embodiment, the selection request contains a partial identifier of the application.

According to an embodiment, the list of applications contains payment application identifiers.

An embodiment provides a mobile terminal programmed according to the above method.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

The same elements have been designated with the same reference numerals in the different drawings.

For clarity, only those steps and elements which are useful to the understanding of the embodiments which will be described have been shown and will be detailed. In particular, the exchanges between the mobile terminal and the servers of validation of payment-type operations as well as the protocols of information exchange between the terminal and the card have not been detailed, the described embodiments being compatible with usual exchanges and protocols.

The embodiments are described by taking as an example the mobile phone and a chip card (or microcircuit card). They however more generally apply to any device used as a point of sale and to any payment device where similar problems are posed. Further, although reference is made to payment applications, the described embodiments transpose to applications of different nature provided that they generate the same problems and that they are compatible with the described solutions.

Figure 1:
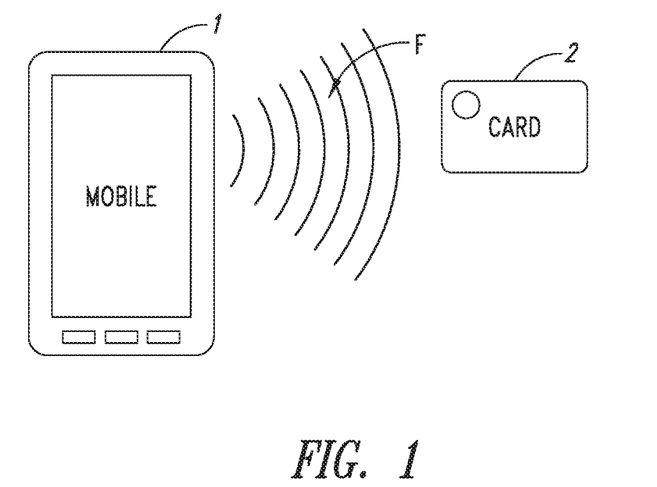
FIG. 1 very schematically shows an embodiment of a contactless payment system using a mobile phone.

FIG. 1 very schematically shows an embodiment of a contactless payment system using a mobile phone 1 (MOBILE), of the type to which the described embodiments apply as an example.

Mobile phone 1 is usually equipped with the circuits and applications of communication with mobile telephony systems. Further, phone 1 is equipped with circuits and applications which enable it to communicate in near field, as an electromagnetic transponder. In near-field communication, the telephone may operate in card mode to be used, for example, as a payment or access control card by exchanging information with a terminal.

The mobile phones 1 targeted by the present description may also operate in reader mode, that is, emulate a near-field communication terminal and generate an electromagnetic field F to communicate with, and possibly power, circuits of a microcircuit card 2 (CARD) or of a device operating in card mode.

For simplification, reference will be made hereafter to a payment card to designate a microcircuit card 2 or the device operating in card mode and to a phone 1 to designate the mobile phone or terminal used as a point of sale.

A phone is not a secure payment terminal like a usual "point of sale". Indeed, a mobile phone is generally equipped with an embedded secure element (eSE) and/or with a microcircuit card (Universal Integrated Circuit Card) used as secure element(s) and having access to the near-field communication interface (CLF) of the phone. Further, in certain applications, the central processing unit (for example, a microcontroller or microprocessor) of the phone controls the near-field communication interface without using such secure elements. Now, to operate as a point of sale, it should be ascertained that the interface is controlled by a secure element, preferably a dedicated secure element or, as a variation, a specific operating mode of the CLF interface to ascertain that a payment transaction is performed in a separate environment.

There thus is a risk for a malicious application, hosted by the phone and having access to the near-field communication interface, to pirate the payment transaction performed when the phone is used as a point of sale.

Figure 2:
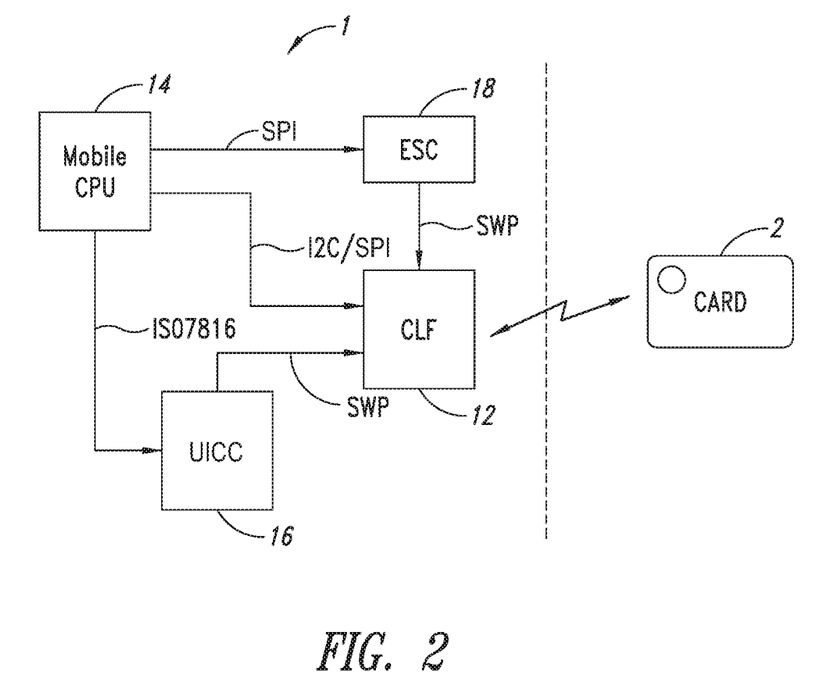
FIG. 2 is a simplified block diagram of an example of interaction between different circuits of a mobile phone executing a point of sale application.

FIG. 2 is a simplified block diagram of an example of interaction between different circuits of a mobile phone and of a card. For simplification, only a portion of the circuits interacting with the payment operation has been illustrated. In particular, the phone is equipped with a screen, generally tactile, and/or with a keyboard, which are used in a payment operation and which have not been illustrated.

The near-field communication interface 12 (CLF—Contact Less Front end) of the phone is capable of generating an electromagnetic field F (FIG. 1) to communicate and possibly remotely supply card CARD.

According to the applications executed by central processing unit 14 (MOBILE CPU) of the phone, the access to interface 12 is performed:
  directly, for example, on a I2C- or SPI-type bus;
  via a microcircuit card 16 (UICC—Universal Integrated Circuit Card) equipping the phone (in this case, the exchanges between card 16 and interface 12 for example use a single-wire communication protocol (SWP) while the exchanges between unit 14 and card 16 use a standardized protocol ISO7816); or
  via an embedded secure element 18 (eSE) equipping the phone (in this case, the exchanges between element 18 and interface 12 for example use a single-wire communication protocol (SWP) while the exchanges between unit 14 and element 18 for example use a SPI-type bus or an emulation of standardized protocol ISO7816).

When the phone can operate as a point of sale, it for example comprises an embedded secure element 18 hosting a mobile point of sale (mPOS) application, a specific operating mode of the CLF interface or the like. A particularly widespread application is the EMV application (Eurocard-MasterCard-Visa) to which reference will be made hereafter for simplification. Similarly, although, for simplification, reference will be made to a solution with an embedded secure element, all that is described hereafter transposes to the other solutions of control of mobile point of sale applications.

To execute a payment operation, a payment request REQ should be sent by element 18 via interface 12. Card 2 responds to this request by sending the identification data of the payment application (phone 1) with which it is compatible. Indeed, the point of sale may accept a plurality of payment card types, for example, Visa and MasterCard, but card 2 only operates according to an application.

According to the described embodiments, it is provided to have phone 1 execute verification steps to authorize or to forbid the carrying on of the payment operation.

It could have been devised to verify that a payment request REQ comes from element 18 over the SWP link and does not directly come from unit 14 over the I2C/SPI link. However, in certain phones, this request comes from the central processing unit of the phone. Accordingly, such a solution would make many phones incompatible, even if the payment operation itself is controlled by a secure element 18.

It is provided to take advantage of the fact that the payment applications can be identified by an application code or identifier (AID—Application Identifier Data) and are by a limited number (in the order of some hundred). Further, a payment card (for example, Visa) is only compatible with a limited number of, or even a single, payment application(s). Accordingly, it is possible to compare the application identifier in a list stored in interface 12 or in element 18.

It could have been devised, before authorizing the sending of a request to the card, to compare application identifier data AID with an authorized list stored in element 18. However, a difficulty is that, on the phone side, the complete identifier is not always known, but only a portion of this identifier may in certain cases be compared with a stored list. Now, only performing the verification on a portion of the identifier may result in uselessly blocking requests. Indeed, taking the example of a VISA-type bank transaction for which the AID identifier data would arbitrarily be "VISA", the AID identifier data may be only partly diffused by the phone, for example, as only "VI". Thus, to validate or not the application, if before the sending of the request, the system blocks VI, it is risked to end up in a situation where an application VIxx, for example, VIAB, VISP, etc., requiring no access to the bank application, is blocked.

Figure 3:
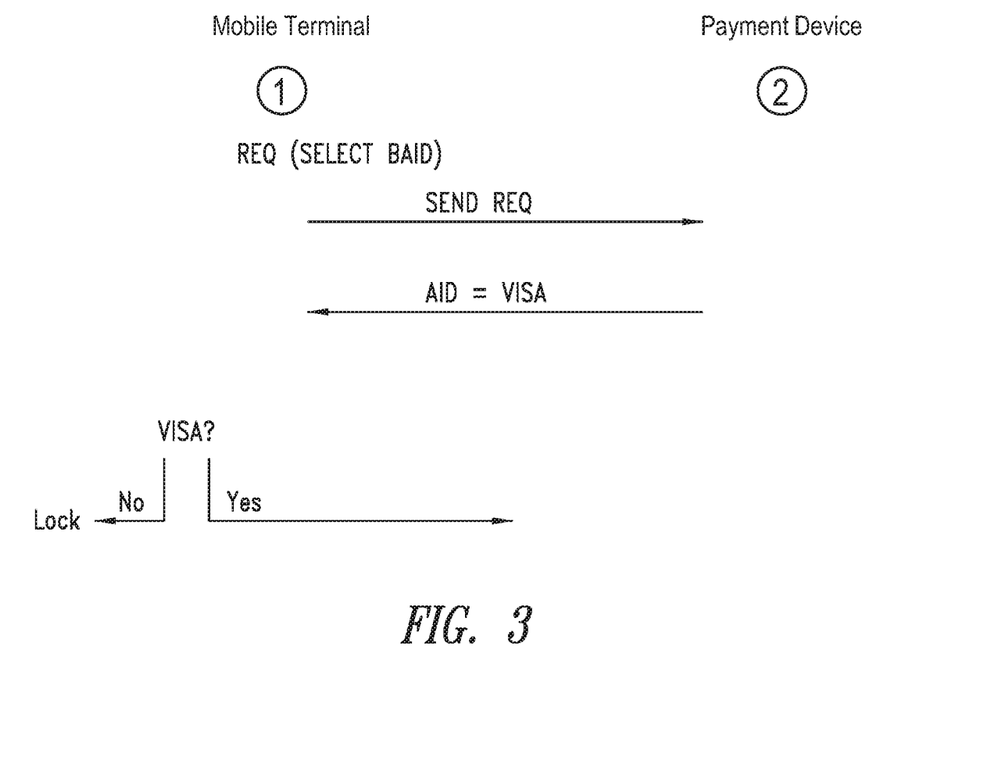
FIG. 3 schematically illustrates an embodiment of a method of validating a payment application.

FIG. 3 schematically illustrates in the form of blocks an embodiment of a method of controlling the authenticity of an operation.

When phone 1 generates a payment request REQ, be it by its central processing unit 14 or by its secure element 18, this request is transmitted (SEND REQ) to card 2.

Thus, according to the embodiments of the present description, the request is transmitted in all cases (SEND REQ) to card 2.

If card 2 is not compatible with a payment, it does not respond and the transaction stops.

If card 2 is compatible with a payment, it responds by transmitting the AID identification data of the type of application with which it is compatible. However, unlike the phone, card 2 transmits the complete identifier of the payment application with which it is compatible. Taking the example of a VISA identifier, card 2 returns AID identifier VISA and not only VI.

On the phone side, interface 12 or element 18 compares the received identifier with a list of authorized identifiers (VISA?). If the identifier is valid (YES), the payment transaction is performed. If it is not (NO), the transaction is blocked (LOCK).

Figure 4:
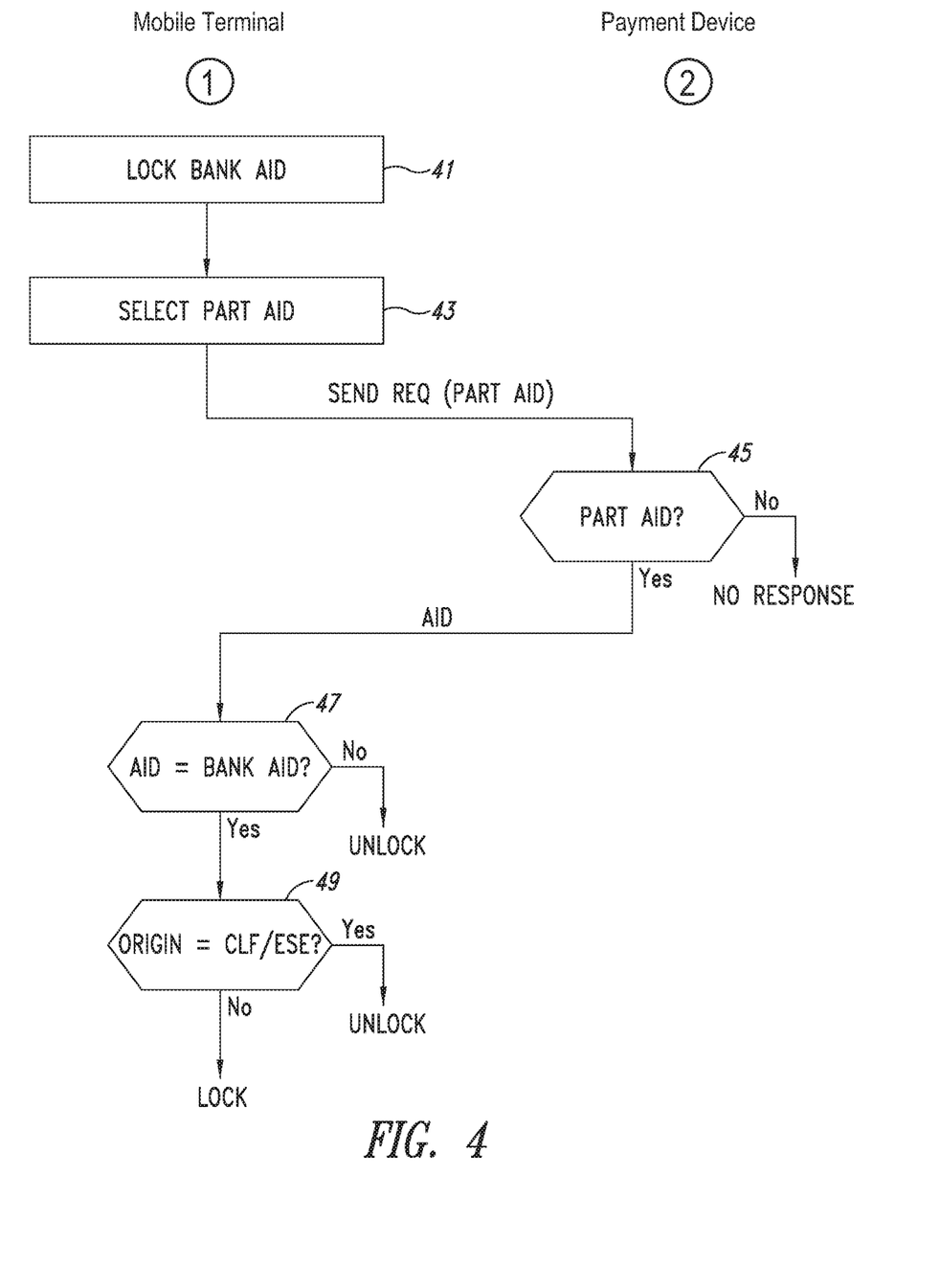
FIG. 4 schematically illustrates another embodiment of a method of validating a payment application.

FIG. 4 illustrates another preferred embodiment where phone 1 does not verify the authorized identifiers but verifies the forbidden identifiers in the case of a communication which is not filtered by interface 12 or by secure element 18.

Thus, by default, a bank application cannot be executed by the phone. The bank applications are blocked (locked) for example by circuit 12 (block 41, LOCK BANK AID).

When an application is selected by the phone, it is assumed that the selection control signal which is sent to the card only contains a portion of the identifier. Thus, a control signal SELECT PART AID (block 43) is selected by the phone, either by circuit 12, circuit 18, or circuit 14. This control signal is sent in the form of a request (SEND REQ(PART AID)) to card 2. Taking the VISA example, the partial identifier is for example VI. The request is processed by the card as normal, that is, card 2 verifies that it effectively hosts an application containing this partial identifier (block 45, PART AID?). If it does not (output N of block 45), the card does not respond (NO RESPONSE) or returns an error message. If it does (output Y of block 45), the card returns the complete AID identifier of the application that it hosts.

Thus, assuming the case of a selection of a VISA-type bank application, if the card is not a VISA card and hosts no application having its identifier starting with VI, it does not respond. If, as illustrated, card 2 effectively is a VISA card, it responds by sending the complete AID=VISA identifier.

On the side of phone 1, the circuit in charge of selecting the application, typically CLF circuit 12 or circuit 18 having an application selection request SELECT transiting therethrough, verifies whether the complete AID identifier is included in the list of bank applications (block 47, AID=BANK AID?). If it is not (output N of block 47), the application is authorized (UNLOCK) whatever the origin (central processing unit 14, interface 12, or secure element 18) of selection control signal SELECT. Thus, any application which has a partial identifier common to a bank application but which is not a bank application is authorized. If the AID identifier is contained in the list of bank applications (output Y of block 47), the circuit (interface 12 or secure element 18 according to the applications and to the phone models) having application selection request SELECT transiting therethrough verifies whether the selection control signal (block 49, ORIGIN=CLF/eSE?) effectively originates from a secure element.

If it does not (output N of block 49), the application remains blocked (LOCK). In case of a blocking of the request by element 12 or 18, the response will preferably be adapted to the caller in order not to disturb the system. For example, an error code indicating that the AID identifier does not exist is returned. According to another example, element 12 or 18 forbids any control (other than an error code) towards the distant card as long a selection control does not succeed. This amounts, on the mobile terminal side, to transmitting to the payment device the information that there is no compatibility.

If the selection control signal effectively originates from a secure element (output Y of block 49), the circuit (for example, 12) controlling the execution of the applications authorizes the execution (UNLOCK).

An advantage is that even in the case of a partial identifier sent by the phone to card 2, on response of card 2 with the complete identifier, the circuit 12 or 18 which generates the request only authorizes the bank application if the request has come from circuit 18.

An advantage of performing the verification from the phone and not from the card is that this enables to solve problems of lack of response which may otherwise be multiple.

Another advantage is that the described solution is compatible with existing cards and requires no modification thereof.

Various embodiments have been described. Various alterations, modifications, and improvements will occur to those skilled in the art. In particular, the identifiers taken as an example are arbitrary. Further, although the embodiments have been more specifically described in relation with an example of application to bank transactions, they transpose to other applications where similar problems are posed. Further, the practical implementation of the described embodiments is within the abilities of those skilled in the art based on the functional indications given hereabove and by using circuits usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A mobile terminal, comprising:
   a near field communication (NFC) circuit configured for wireless communication with a payment device that provides payment information for completing a transaction;
   a first embedded secure element communicatively coupled to the NFC circuit;
   a second embedded secure element communicatively coupled to the NFC circuit; and
   a processing unit communicatively coupled to the NFC circuit, the first embedded secure element, and the second embedded secure element, wherein the mobile terminal is configured to:
      transmit an application selection request to the payment device, the application selection request transiting through one of the first embedded secure element and the second embedded secure element, the application selection request communicated to the payment device via the NFC circuit; and
      verify an application identifier received from the payment device against a list of authorized applications, the verification performed by the one of the first embedded secure element and the second embedded secure element having the application selection request transiting therethrough,
   wherein the first and second embedded secure elements are different from one another and communicate with the processing unit via different communications protocols,
   wherein the first embedded secure element is configured to communicate with the processing unit via a serial peripheral interface SPI type bus, and the second embedded secure element is configured to communicate with the processing unit via a OSP7816 protocol.

2. The mobile terminal of claim 1, wherein the mobile terminal is further configured to:
   block execution of applications represented in said list of authorized applications by default.
3. The mobile terminal of claim 1, wherein the mobile terminal is further configured to:
   transmit an indication of incompatibility to the payment device when the verification fails.
4. The mobile terminal of claim 1, wherein the mobile terminal is further configured to:
   only authorize execution of an application represented in said list of authorized applications by the one of the first embedded secure element and the second embedded secure element having the application selection request transiting therethrough if the application selection request originates from one of the first embedded secure element and the second embedded secure element.
5. The mobile terminal of claim 4, wherein the one of the first embedded secure element and the second embedded secure element having the application selection request transiting therethrough is different from the one of the first embedded secure element and the second embedded secure element where the application selection request originated.
6. The mobile terminal of claim 1, wherein the application selection request contains an incomplete identifier of an application associated with the application selection request.
7. The mobile terminal of claim 1, wherein the mobile terminal is configured to operate as a mobile point of sale device.
8. The mobile terminal of claim 1, wherein the first embedded secure element is configured to communicate with the NFC circuit via a single wire protocol, and the second embedded secure element is configured to communicate with the NFC circuit via a single wire protocol.
9. The mobile terminal of claim 1, wherein the second embedded secure element is configured according to a Universal Integrated Circuit Card protocol.
10. A method, comprising:
    establishing, by a mobile terminal having a near field communication (NFC) circuit, wireless communication with a payment device that provides payment information for completing a transaction, the mobile device including first and second embedded secure elements that are different from one another and communicatively coupled to the NFC circuit, and the mobile device including a processing unit communicatively coupled to the NFC circuit and the first and second embedded secure elements, the processing unit communicatively coupled to the at least first embedded secure element via a ISO7816 protocol;
    transmitting, via the NFC circuit, an application selection request to the payment device, the application selection request transiting through one of the first or second embedded secure elements;
    receiving an application identifier received from the payment device; and
    verifying the application identifier against a list of authorized applications, the verification performed by the one of the first or second embedded secure elements having the application selection request transited therethrough.
11. The method of claim 10, further comprising:
    blocking execution of applications represented in said list of authorized applications by default; and
    transmitting an indication of incompatibility to the payment device when the verifying fails.
12. The method of claim 10, wherein the application selection request contains an incomplete identifier of an application associated with the application selection request.
13. A mobile terminal, comprising:
    a means for communicating with a payment device via a near field communication (NFC) protocol, the payment device providing payment information for completing a transaction;
    a first embedded secure means communicatively coupled to the means for communicating;
    a second embedded secure means communicatively coupled to the means for communicating; and
    a processing means communicatively coupled to the means for communicating, the first embedded secure means, and the second embedded secure means, wherein the mobile terminal is configured to:
        transmit an application selection request to the payment device, the application selection request transiting through one of the first embedded secure means and the second embedded secure means, the application selection request communicated to the payment device via the means for communicating; and
        verify an application identifier received from the payment device against a list of authorized applications, the verification performed by the one of the first embedded secure means and the second embedded secure means having the application selection request transiting therethrough,
    wherein the first and second embedded secure means are different from one another and communicate with the processing means via different communications protocols,
    wherein the first embedded secure means is configured to communicate with the processing means via a serial peripheral interface (SPI) type bus, and the second embedded secure means is configured to communicate with the processing means via a ISO07816 protocol.
14. The mobile terminal of claim 13, wherein the mobile terminal is further configured to:
    block execution of applications represented in said list of authorized applications by default.
15. The mobile terminal of claim 13, wherein the mobile terminal is further configured to:
    transmit an indication of incompatibility to the payment device when the verification fails.
16. The mobile terminal of claim 13, wherein the mobile terminal is further configured to:
    only authorize execution of an application represented in said list of authorized applications by the one of the first embedded secure means and the second embedded secure means having the application selection request transiting therethrough if the application selection request originates from one of the first embedded secure means and the second embedded secure means.
17. The mobile terminal of claim 16, wherein the one of the first embedded secure means and the second embedded secure means having the application selection request transiting therethrough is different from the one of the first embedded secure means and the second embedded secure means where the application selection request originated.
18. A mobile terminal, comprising:
    a near field communication (NFC) circuit configured for wireless communication with a payment device that provides payment information for completing a transaction;
    a first embedded secure element communicatively coupled to the NFC circuit; and a processing unit communicatively coupled to the NFC circuit and the first embedded secure element, wherein:
the mobile terminal is configured to transmit an application selection request to the payment device via the first embedded secure element and the NFC circuit;
the first embedded secure element is configured to verify an application identifier received from the payment device against a list of authorized applications and, if the application identifier identifies a selected application of the authorized applications on the list, cause the selected application to be unlocked;
the first and second embedded secure elements are different from one another and communicate with the processing unit via different communications protocols; and
the first embedded secure element is configured to communicate with the processing unit via a serial peripheral interface (STD) type bus, and the second embedded secure element is configured to communicate with the processing unit via ISO07816 protocol.

19. The mobile terminal of claim 18, comprising:
a plurality of embedded secure elements communicatively coupled to the NFC circuit and the processing unit, wherein the first embedded secure element is one of the plurality of embedded secure elements, wherein:
the mobile terminal is configured to transmit the application selection request to the payment device via any one of the plurality of embedded secure elements and the NFC circuit; and
any one of the plurality of embedded secure elements is configured to verify the application identifier received from the payment device against a list of authorized applications and, if the application identifier identifies the selected application of the authorized applications on the list, cause the selected application to be unlocked.

20. The mobile terminal of claim 19, wherein the mobile terminal is further configured to:
block execution of applications represented in said list of authorized applications by default; and
communicate an indication of incompatibility to the payment device when the verification fails.

21. The mobile terminal of claim 19, wherein the mobile terminal is further configured to:
only authorize execution of an application represented in said list of authorized applications by a selected one of the plurality of embedded secure elements having the application selection request transiting therethrough if the application selection request originates from one of the plurality of embedded secure elements.

22. The mobile terminal of claim 21, wherein the selected one of the plurality of embedded secure elements having the application selection request transiting therethrough is different from another one of the plurality of embedded secure elements where the application selection request originated.

* * * * *

UNITED STATES PATENT AND TRADEMARK OFFICE
CERTIFICATE OF CORRECTION

PATENT NO. : 11,068,880 B2
APPLICATION NO. : 15/180989
DATED : July 20, 2021
INVENTOR(S) : Olivier Van Nieuwenhuyze et al.

It is certified that error appears in the above-identified patent and that said Letters Patent is hereby corrected as shown below:

In the Claims

Column 6, Claim 1, Line 67:
"OSP7816" should read: -- ISO7816 --.

Column 7, Claim 10, Line 50:
"the at least first embedded" should be: -- the first embedded --.

Column 7, Claim 10, Line 51:
"secure element via a ISO7816 protocol;" should read: -- secure element via a serial peripheral interface (SPI) type bus, and the processing unit communicatively coupled to the second embedded secure element via a ISO7816 protocol; --.

Column 8, Claim 13, Line 37:
"ISO07816" should read: -- ISO7816 --.

Column 9, Claim 18, Line 18:
"interface (STD) type" should read: -- interface (SPI) type --.

Column 9, Claim 18, Line 20:
"ISO07816" should read: -- ISO7816 --.

Signed and Sealed this
Seventeenth Day of May, 2022

Katherine Kelly Vidal
*Director of the United States Patent and Trademark Office*